US008494516B2

(12) United States Patent
Acharya et al.

(10) Patent No.: US 8,494,516 B2
(45) Date of Patent: Jul. 23, 2013

(54) DELIVERY OF SUBSCRIPTION SERVICES TO ROAMING USERS THROUGH HEAD END EQUIPMENT

(75) Inventors: Swarup Acharya, New Providence, NJ (US); Bhawna Gupta, Edison, NJ (US); Anurag Srivastava, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1540 days.

(21) Appl. No.: 11/399,872

(22) Filed: Apr. 7, 2006

(65) Prior Publication Data

US 2007/0240192 A1    Oct. 11, 2007

(51) Int. Cl.
*H04W 4/00*    (2009.01)

(52) U.S. Cl.
USPC ............. 455/433; 725/86; 725/87; 725/60; 725/61

(58) Field of Classification Search
USPC ............................ 725/87, 86, 60–61; 455/433
See application file for complete search history.

(56) References Cited

U.S. PATENT DOCUMENTS

| RE34,895 E | 4/1995 | Morotomi et al. |
| 2001/0020299 A1* | 9/2001 | Barraclough et al. ......... 725/87 |
| 2003/0030751 A1 | 2/2003 | Lupulescu et al. |
| 2003/0200548 A1* | 10/2003 | Baran et al. ..................... 725/90 |
| 2004/0116118 A1 | 6/2004 | Karaoguz et al. |
| 2004/0117813 A1* | 6/2004 | Karaoguz et al. ................ 725/5 |
| 2004/0128693 A1 | 7/2004 | Weigand |
| 2004/0221305 A1 | 11/2004 | Broussard et al. |

(Continued)

FOREIGN PATENT DOCUMENTS

| CA | 2368628 | 7/2002 |
| EP | 1041825 | 10/2000 |

(Continued)

OTHER PUBLICATIONS

U.S. Appl. No. 11/399,726, filed Apr. 7, 2006, Anurag Srivastava, "Method and Apparatus for Delivering Subscription Service Content to Roaming Users."

(Continued)

*Primary Examiner* — Kathy Wang-Hurst
(74) *Attorney, Agent, or Firm* — Ryan, Mason & Lewis, LLP

(57) ABSTRACT

A subscriber or other user is provided with access to a subscription service of a signal distribution system at a location remote from a home location of the user. The subscription service comprises a plurality of selectable channels available to the user at the home location. The user is assigned one of a plurality of program streams utilizable for delivery of content from the head end equipment servicing the remote location to an interface device at the remote location. By way of example, the program streams may be part of existing unicast infrastructure in the head end equipment. The head end equipment obtains content for a first channel of the subscription service available to the user at the home location, and inserts the content for the first channel into the assigned program stream to thereby make that content accessible to the user at the remote location via the interface device. User selection via the remote location interface device of a different channel of the subscription service available to the user at the home location causes the content for the different channel to be obtained by the head end equipment and inserted into the assigned program stream in place of the content for the first channel.

22 Claims, 4 Drawing Sheets

U.S. PATENT DOCUMENTS

| | | | |
|---|---|---|---|
| 2004/0233281 A1 | 11/2004 | Tolmei | |
| 2004/0235492 A1 | 11/2004 | Chang et al. | |
| 2004/0259522 A1 | 12/2004 | Alicherry et al. | |
| 2005/0188410 A1* | 8/2005 | Kahn et al. | 725/100 |
| 2005/0210138 A1 | 9/2005 | Zigmond et al. | |
| 2005/0240961 A1* | 10/2005 | Jerding et al. | 725/37 |
| 2006/0277576 A1 | 12/2006 | Acharya et al. | |
| 2007/0124779 A1* | 5/2007 | Casey et al. | 725/87 |
| 2007/0143804 A1* | 6/2007 | Wang | 725/95 |

FOREIGN PATENT DOCUMENTS

| | | |
|---|---|---|
| EP | 1585313 | 10/2005 |
| GB | 2 215 568 A | 9/1989 |
| JP | 63-298698 | 12/1988 |
| JP | 3-134799 | 6/1991 |
| JP | 2001345766 A | 12/2001 |
| JP | 2002232861 A | 8/2002 |
| JP | 2003-189288 | 7/2003 |
| JP | 2004357116 A | 12/2004 |
| JP | 2005033664 A | 2/2005 |
| JP | 2005534228 A | 11/2005 |
| WO | WO 01/15451 A1 | 3/2001 |
| WO | WO 2004/061696 A1 | 7/2004 |
| WO | PCT/US07/008115 | 9/2007 |

OTHER PUBLICATIONS

U.S. Appl. No. 11/145,832, filed Jun. 6, 2005, Acharya et al., "Signal Distribution System with User-Defined Channel Comprising Information from an External Network."

U.S. Appl. No. 11/130,329, filed May 16, 2005, Acharya et al., "Method and Apparatus for Providing Remote Access to Subscription Television Services."

* cited by examiner

DELIVERY OF SUBSCRIPTION SERVICES TO ROAMING USERS THROUGH HEAD END EQUIPMENT

RELATED APPLICATION(S)

The present application is related to U.S. patent application Ser. No. 11/130,329, filed May 16, 2005 and entitled "Method and Apparatus for Providing Remote Access to Subscription Television Services," and U.S. patent application Ser. No. 11/145,832, filed Jun. 6, 2005 and entitled "Signal Distribution System with User-Defined Channel Comprising Information from an External Network," both of which are commonly assigned herewith and incorporated by reference herein.

The present application is also related to U.S. patent application Ser. No. 11/399,726, entitled "Method And Apparatus For Delivering Subscription Service Content To Roaming Users," which is filed concurrently herewith and incorporated by reference herein.

FIELD OF THE INVENTION

The present invention relates generally to signal distribution systems, and more particularly to techniques for distributing content associated with subscription services to roaming users in signal distribution systems.

BACKGROUND OF THE INVENTION

Conventional signal distribution systems include, by way of example, cable television systems, satellite television systems, and systems providing IPTV over digital subscriber line (DSL) or fiber. Such systems are configured to distribute media streams associated with subscription television services to system subscribers or other users. Subscription television services are usually tied to a particular household or other predetermined subscriber location. Typically, a given subscriber is provided with an interface device, such as a set-top box or receiver, for communicating with system head end equipment. The interface device is configured to permit the subscriber to receive, on a television or other presentation device coupled to the interface device at a home location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A serious drawback of conventional cable, satellite and IPTV systems is that there is typically no roaming capability provided for subscribers. That is, subscribers generally must be at their respective home locations in order to receive the television services to which they have subscribed. By way of example, if a first subscriber leaves his or her home location and visits a remote location that also serves as a home location for a second subscriber, there is no mechanism provided for allowing the first subscriber to access his or her subscription television services at the second subscriber location. Thus, if the first subscriber has paid for access to a premium programming channel at his or her home location, that subscriber has no ability to access the premium programming channel at the remote location. This is the case even if the remote location, that is, the home location of the second subscriber, has the same television service provider and type of interface device as the home location of the first subscriber.

The above-cited U.S. patent application Ser. No. 11/130,329 discloses techniques which address and solve the remote accessibility problem. In one embodiment disclosed therein, an arrangement is provided whereby subscribers can access their usual home location subscription television services when at remote locations, without the need for carrying media devices, communications devices or other equipment to the remote locations.

Further advances in remote accessibility are described in the above-cited U.S. patent application Ser. No. 11/145,832. As disclosed therein, users of a cable, satellite or IPTV system, or other type of signal distribution system, may be provided with access to user-defined content that is obtained by a service provider from one or more external networks. A user-defined channel, comprising content specified by a system user, is provided as one of a plurality of channels of a subscription service in a signal distribution system. The user-defined channel may comprise, for example, a tracking channel that identifies a current location of at least one entity, such as a particular family member, specified by the system user. As another example, the user-defined channel may comprise a video monitoring channel, with the video signals being sourced from video cameras at one or more monitored locations.

Despite the considerable advances provided by the techniques described in U.S. patent application Ser. Nos. 11/130,329 and 11/145,832, a need remains for additional improvements in providing user accessibility to subscription television services or other content via cable, satellite and IPTV systems, as well as other types of signal distribution systems.

SUMMARY OF THE INVENTION

The present invention in an illustrative embodiment provides techniques for delivering roaming television services or other types of subscription services using network head end equipment. More particularly, the illustrative embodiment deals with delivery of roaming television services via cable network head end equipment utilizing unicast infrastructure associated with that head end equipment. The unicast infrastructure may be, for example, video-on-demand (VoD) infrastructure associated with that head end equipment, network personal video recorder (NPVR) infrastructure associated with that head end equipment, or any other type of unicast infrastructure available in the head end equipment.

In accordance with one aspect of the invention, a subscriber or other user is provided with access to a subscription service of a signal distribution system at a location remote from a home location of the user. The subscription service comprises a plurality of selectable channels available to the user at the home location. The user is assigned one of a plurality of program streams utilizable for delivery of content from the head end equipment servicing the remote location to a set-top box or other interface device at the remote location. The head end equipment obtains content for a first channel of the subscription service available to the user at the home location, and inserts the content for the first channel into the assigned program stream to thereby make that content accessible to the user at the remote location via the interface device. Subsequent user selection via the remote location interface device of a different channel of the subscription service available to the user at the home location causes the content for the different channel to be obtained by the head end equipment and inserted into the assigned program stream in place of the content for the first channel. The content for one or more of the channels of the subscription service may be obtained by the head end equipment from a roaming server that is coupled via a transport network to one or more additional roaming servers. Such additional roaming servers may be associated with other head ends within the system.

In the illustrative embodiment, the head end equipment comprises cable network head end equipment of a cable television system, and the plurality of program streams comprises one or more unicast program streams normally utilized for delivery of, for example, VoD or NPVR content from respective VoD or NPVR servers in the cable network head end equipment to the remote location interface device. More specifically, the program streams may comprise program streams of a given analog quadrature amplitude modulation (QAM) channel of a hybrid fiber coax (HFC) pipe or other transmission medium. The program stream assignment may be, for example, of the form X.Y, where X denotes a particular assigned one of the analog QAM channels and Y denotes the assigned program stream of that QAM channel. Numerous other program stream assignment arrangements may be used in other embodiments.

The present invention in the above-noted illustrative embodiment makes advantageous use of existing head end infrastructure, allowing efficient and cost-effective deployment of roaming television services in cable television systems. The described techniques can also be adapted in a straightforward manner for use in other types of signal distribution systems.

DETAILED DESCRIPTION OF THE INVENTION

The invention will be illustrated herein in conjunction with illustrative embodiments of signal distribution systems. It should be understood, however, that the invention is not limited to use with the particular systems and techniques described, but is instead more generally applicable to any signal distribution application in which it is desirable to provide improved roaming capabilities to system users. For example, although described herein primarily in the context of subscription television services, the techniques of the invention can also be adapted in a straightforward manner to subscription audio services, such as those delivered via digital satellite radio systems. Systems of the latter type are considered a type of signal distribution system as that term is used herein.

Figure 1A:
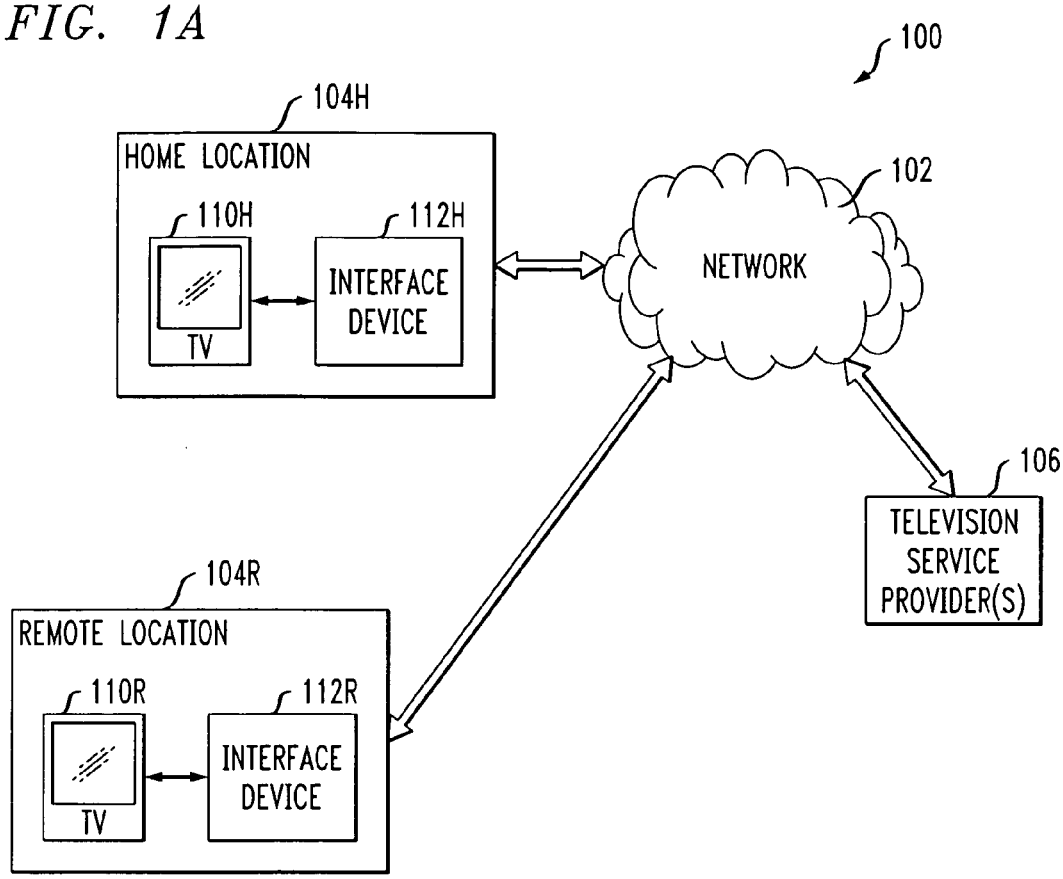
FIG. 1A shows an illustrative embodiment of a signal distribution system in accordance with the invention.

Referring now to FIG. 1A, a signal distribution system 100 comprises a network 102 over which equipment at a home location 104H and a remote location 104R communicates with one or more television service providers 106. The signal distribution system 100 may comprise, by way of example, a cable television system, a satellite television system, or portions or combinations of these and other systems. Element 106 may comprise otherwise conventional service provider equipment, including, for example, head end systems, satellites, servers, etc. The equipment at the home location 104H comprises a television 110H coupled to an interface device 112H. Similarly, the equipment at the remote location 104R comprises a television 110R coupled to an interface device 112R. The interface devices 112 may comprise, for example, set-top boxes, receivers, computers, or other processor-based devices, in any combination.

The network 102 may comprise any type of communication network suitable for transporting signals associated with the provision of subscriber television services, and the invention is not limited in this regard. For example, portions of the network 102 may comprise local networks, wide area networks, the Internet, etc.

The home location 104H is a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

A home location for a given subscriber may serve as a remote location for another subscriber or subscribers. The remote location 104R therefore may be a home location for another system subscriber. Accordingly, remote location 104R, like home location 104H, is also equipped with a television and an interface device as shown. In other embodiments, the remote location need not be a home location for any particular subscriber. For example, the remote location may be a room or other area in a hotel or means of conveyance that is intended to serve multiple subscribers over a given period of time.

It is to be appreciated that the invention does not require any particular geographic relationship between the home location 104H and the remote location 104R. Accordingly, the two locations may be within the same local area, served by a common service provider. As another example, the two locations may be more geographically remote from one another, such as in different regions of the same country, or even in different countries, with the two locations being serviced by different television service providers. It is also possible that the home and remote locations may be in a common building or other structure, for example, in respective first and second apartments of an apartment building. Numerous alternative arrangements are possible, as will be apparent to those skilled in the art.

Figure 1B:
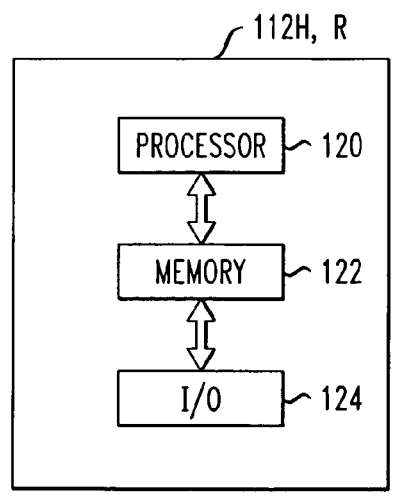
FIG. 1B shows a simplified block diagram of an interface device of the FIG. 1A system.

FIG. 1B illustrates that a given one of the interface devices 112H, 112R comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for implementing roaming television services techniques of a type to be described in greater detail below.

The particular signal distribution system configuration described above should be viewed as an illustrative example of a roaming television service arrangement in accordance with the invention, and it is to be understood that the invention can be implemented using other types and configurations of system components.

Additional details regarding the provision of roaming television services in a system such as that shown in FIG. 1A can be found in the above-cited U.S. patent application Ser. Nos. 11/130,329 and 11/145,832.

The present invention in an illustrative embodiment deals with delivery of roaming television services via cable network head end equipment utilizing unicast infrastructure associated with that head end equipment. The unicast infrastructure is utilized for unicasting to users and may be, for example, video-on-demand (VoD) infrastructure associated with the head end equipment, or network personal video recorder (NPVR) infrastructure associated with the head end equipment. The VoD and NPVR infrastructure may comprise, for example, respective VoD and NPVR servers within the head end equipment configured to provide content that is delivered to users in respective unicast program streams.

The term "unicast" as used herein is intended to be construed broadly, so as to encompass any arrangement for configuring a user-specific program stream for delivery to a particular system user.

It is to be appreciated that the described techniques can be extended in a straightforward manner to be implemented using a wide variety of other types of head end equipment with different types of unicast infrastructure, such as those associated with satellite or IPTV systems.

Generally, a roaming television services technique in this embodiment allows a subscriber to access his or her subscription television services when away from his or her designated home location. As noted previously, in other embodiments of the invention the roaming techniques may be applied to non-television services, such as subscription audio services delivered via digital satellite radio or other arrangements.

Figure 2:
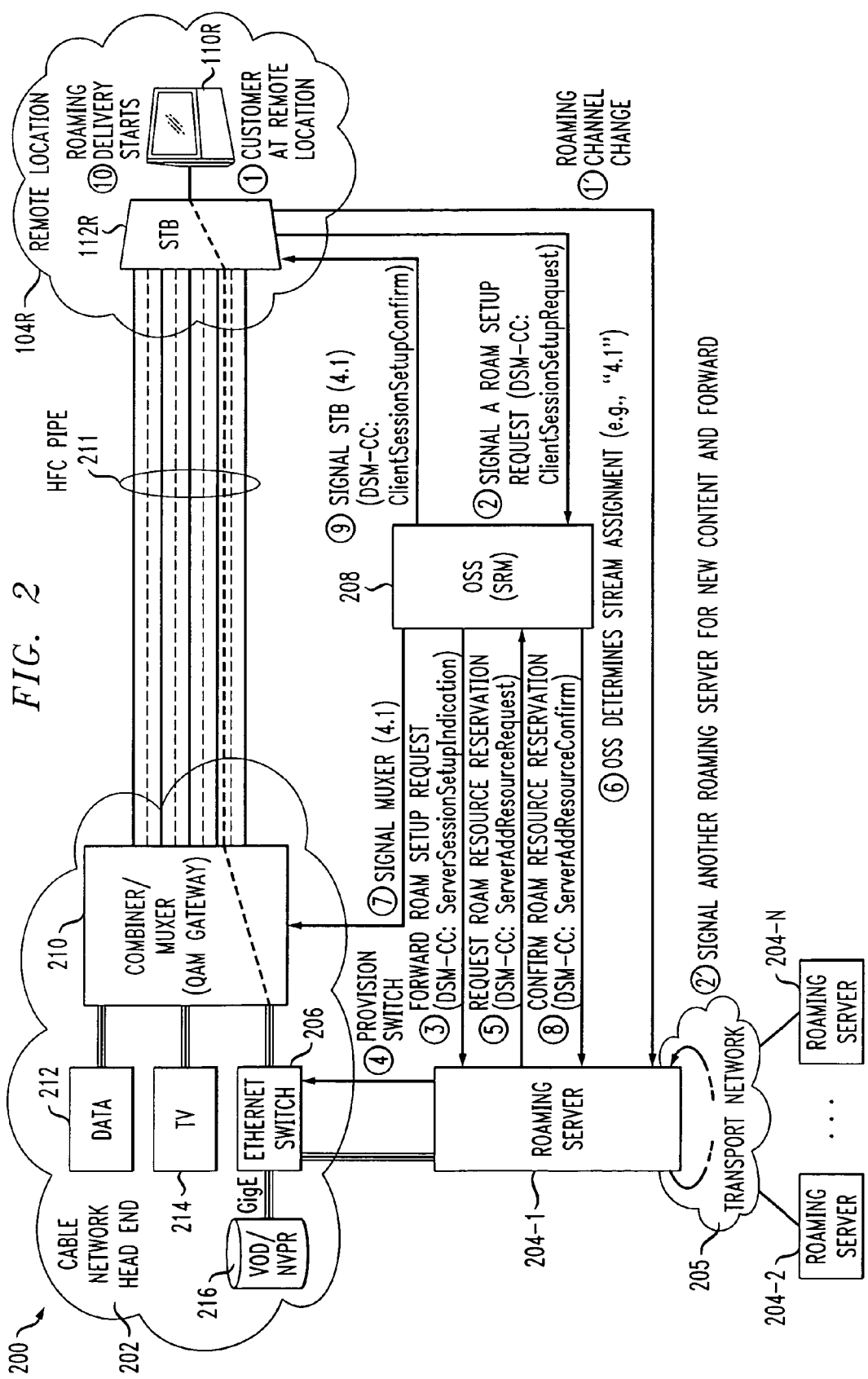
FIG. 2 is a more detailed view of one possible implementation of the FIG. 1A system utilizing unicast infrastructure of cable network head end equipment to deliver roaming television services to a roaming user at a remote location.

FIG. 2 shows one example of a roaming television services delivery technique that is implemented via cable network head end equipment in the system of FIG. 1A. The technique is implemented at least in part in the form of software that is executed by system elements such as one or more interface devices and the equipment of one or more television service providers. Although this example utilizes VoD or NPVR infrastructure, the described techniques can be implemented using other types of unicast infrastructure.

In a conventional cable television system, one or more VoD channels may be provided to subscribers in addition to broadcast channels and premium programming channels. There are generally two aspects to implementing a typical VoD service, namely, content acquisition and content delivery. Content acquisition may involve, for example, distributing pre-packaged content, such as movies, television shows and the like, to a number of VoD servers placed at different locations in the cable television system, such as in each head end, and then retrieving the content from the servers on an as-needed basis responsive to subscriber requests. Content delivery may involve, for example, setting up a signal distribution element in the head end equipment serving a given requesting subscriber such that the appropriate VoD content is delivered to the set-top box or other interface device of that subscriber. One or more NPVR channels may be provided using similar techniques. The signaling used to provide VoD or NPVR services in a cable television system may be based on well-known standards such as Digital Storage Media Command and Control (DSM-CC).

The illustrative embodiment to be described below in conjunction with FIG. 2 advantageously utilizes the underlying VoD or NPVR infrastructure of a cable television system to provide a roaming television service.

Referring now to signal distribution system 200 of FIG. 2, remote location 104R is shown comprising television 110R coupled to interface device 112R. The interface device 112R in this example is a set-top box (STB), but in other embodiments may be a different type of interface device. Also, television 110R may be replaced with another type of presentation device, such as a computer, mobile telephone, personal digital assistant (PDA), wireless email device or any other type of device capable of presenting output associated with a roaming television service. It is also possible that the interface device and presentation device may be combined into a single device, as in an embodiment in which the interface device comprises a network interface of a computer, mobile telephone or other presentation device.

The system 200 further comprises cable network head end equipment 202 and roaming servers 204-1, 204-2, . . . 204-N coupled to a transport network 205. A given one of the roaming servers, namely, roaming server 204-1, is coupled to an Ethernet switch 206 associated with the cable network head end equipment 202, and is able to communicate with the other roaming servers 204-2 through 204-N via the transport network 205. The roaming servers 204 are configured to deliver roaming television service content from head end equipment associated with the home location 104H of a given subscriber to head end equipment associated with the remote location 104R of the given subscriber. One or more of the other roaming servers 204-2 through 204-N may be associated with different head ends of the system. As another example, the roaming servers could be directly connected to respective gateways or other similar elements of head end equipment via Ethernet or another type of transport link. Suitable techniques for communicating content and other information between such servers are described in, for example, the above-cited U.S. patent application Ser. No. 11/130,329.

It is assumed for purposes of illustration that the head end equipment 202 is part of the nearest cable network head end to the remote location 104R. Content associated with various home locations can be delivered to this remote location head end from other head ends via Ethernet switches and associated roaming servers, as previously noted.

Also included in the system 200 is an operational support system (OSS) 208 which in this embodiment comprises a services and resource manager (SRM). The element 208 is an example of what is more generally referred to herein as a "controller." Such a controller, although shown as separate from the cable network head end equipment 202 in this embodiment, may be incorporated in whole or in part within the head end equipment 202, may be distributed across head end equipment 202 and interface device 112R, or otherwise implemented using one or more system elements.

The OSS 208 is coupled between STB 112R and a signal combiner 210 in the head end equipment 202. The signal combiner 210 in this embodiment is more particularly shown as a signal combiner and multiplexer ("muxer") within a quadrature amplitude modulation (QAM) gateway, supporting multiple analog QAM channels each having multiple program streams, although this configuration is merely one example of a type of signal combiner that may be used in implementing the invention. The term "signal combiner" as used herein should therefore be understood to encompass a multiplexer, a QAM gateway or other type of signal combining element, as well as combinations thereof.

The signal combiner 210 is coupled via a hybrid fiber coax (HFC) pipe 211 to the STB 112R as shown. It is to be appreciated that other types of connections may be used to interconnect these system elements, such as otherwise conventional fiber-to-the-home (FTTH) or fiber-to-the-premises (FTTP) arrangements. In this particular embodiment, QAM signals are carried over the HFC pipe 211 from the signal combiner 210 to the STB 112R. However, the invention does not require QAM channels, or any other particular type of transmission media between signal combiner 210 and STB 112R. It should be noted that the term "channel" in the context of transmission between the signal combiner 210 and the STB 112R refers to a transmission channel, which may encompass multiple program streams, and not a channel in terms of a particular television broadcast or premium programming channel as presented on television 110R.

The cable network head end equipment 202 further comprises data source(s) 212, television signal source(s) 214, and a VoD/NPVR server 216. The VoD/NPVR server 216 is illustratively shown as being coupled via a Gigabit Ethernet ("GigE") connection to Ethernet switch 206, although other types of connections could be used. The server 216 may comprise a VoD server, an NPVR server, or a combination of both VoD and NPVR servers. Conventional aspects of such servers are well known to those skilled in the art and therefore not described in detail herein.

It is to be appreciated that the particular arrangement of system elements shown in FIG. 2 is presented by way of illustrative example only. Numerous alternative configurations of system equipment may be used to implement the described roaming techniques. For example, other types of gateways, switches and servers may be used, including a wide variety of otherwise conventional arrangements of such elements suitably reconfigured to implement one or more of the techniques described herein.

The operation of the system 200 will now be described with reference to the step numbers shown in the figure. These steps include steps 1 through 10 associated with an initial acquisition of roaming television service content by a roaming user at remote location 104R, and steps 1' and 2' associated with a subsequent channel change operation. Also shown in conjunction with certain of the steps are exemplary DSM-CC signals that may be utilized, although the invention does not require the use of DSM-CC or any other particular signaling protocol. Moreover, numerous alternative arrangements of steps will be apparent to those skilled in the art, and may be used in place of the particular steps shown.

In step 1, the roaming user, also referred to in this example as a "customer," arrives at the remote location 104R which as indicated above is equipped with television 110R and STB 112R. The user may enter authentication information at the remote location via the STB 112R, for example, as described in the above-cited U.S. patent application Ser. No. 11/130, 329, in order to obtain access to roaming television services.

In step 2, the roaming user initiates a roam setup request. This request is communicated from the STB 112R to the OSS 208.

In step 3, the OSS 208 forwards the roam setup request to the roaming server 204-1.

As one possible alternative, a roam setup request may be sent directly from the STB 112R to the roaming server 204-1.

In step 4, the roaming server 204-1 provisions the Ethernet switch 206 to accept delivery of content from the head end of the home location of the roaming user. This may involve interaction with one or more of the other roaming servers 204 over the transport network 205. For example, the roaming server 204-1 may communicate with a roaming user coupled to an Ethernet switch associated with the head end of the home location of the roaming user.

Figure 3:
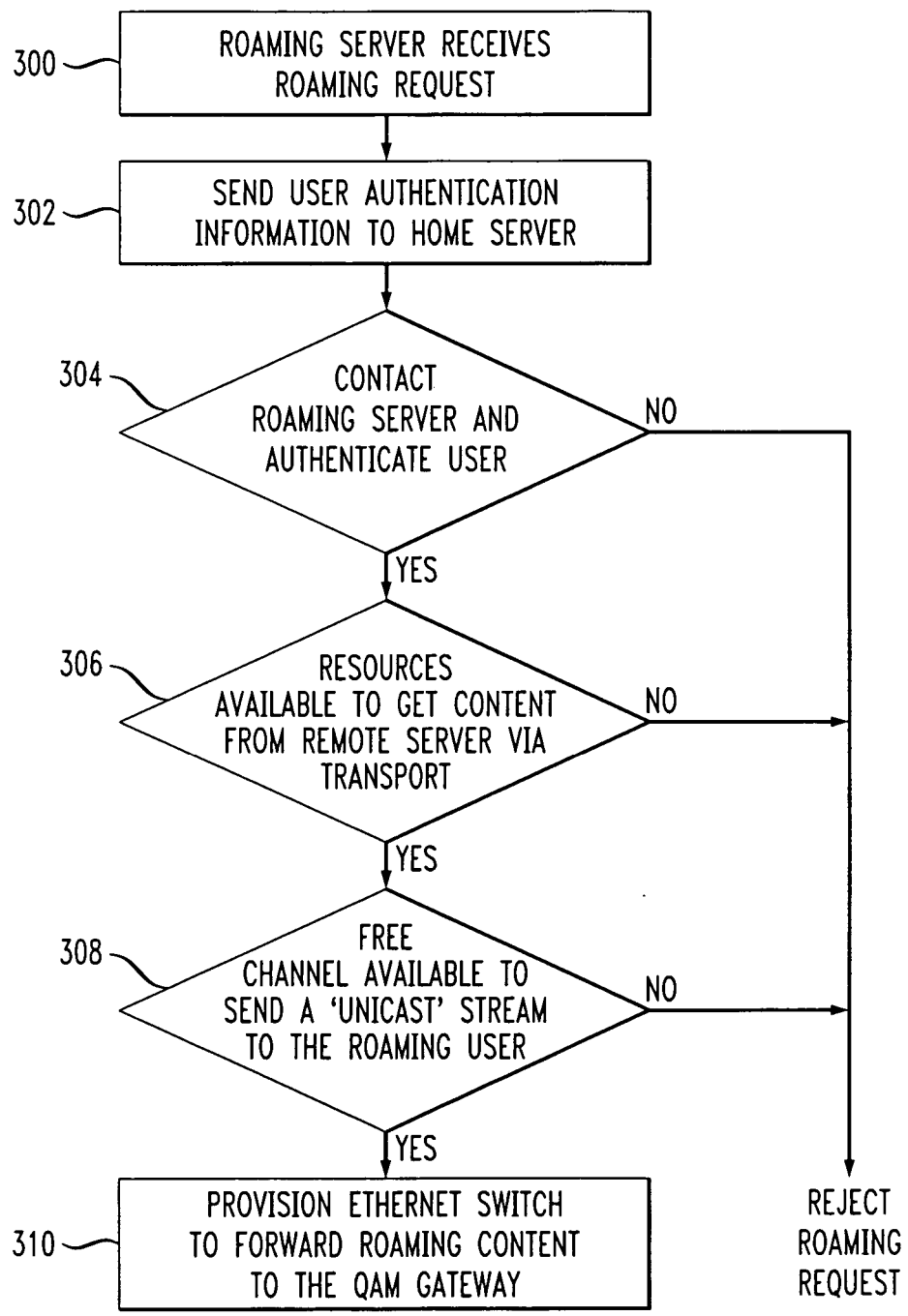
FIG. 3 is a flow diagram illustrating the processing of a roaming request.

One possible process for handling a roaming request in the system 200 is shown in FIG. 3. The roaming request may be the above-noted roam setup request, or another type of roaming request. The roaming server 204-1 receives the roaming request in block 300, and in block 302 sends user authentication information to a home server of that user. The home server may be, for example, a roaming server associated with the head end servicing the home location of the user. In block 304, a determination is made as to whether the user is authenticated. If not, the roaming request is rejected. Otherwise, the process continues with block 306, where a determination is made as to whether sufficient resources are available to transport the content from the home server to the roaming server 204-1 via the transport network 205. If not, the roaming request is rejected. Otherwise, the process continues with block 308, where a determination is made as to whether a free channel is available to send a unicast stream to the roaming user. If not, the roaming request is rejected. Otherwise, the roaming server 204-1 provisions the Ethernet switch 206 to forward roaming content to the QAM gateway 210, as indicated in block 310. It should be emphasized that the FIG. 3 steps are merely exemplary, and numerous alternative processes may be used to handle roaming requests in a given embodiment of the invention.

Referring again now to FIG. 2, in step 5, the roaming server 204-1 requests a roam resource reservation from the OSS 208.

In step 6, the OSS 208 determines an appropriate program stream to be reserved for the delivery of home location content to the roaming user. The program streams available for assignment in this example comprise program streams associated with one or more of the analog QAM channels normally used for delivery of VoD or NPVR content from VoD/NPVR server 216 to the STB 112R via signal combiner 210. The program stream assignment in this embodiment identifies a particular one of a number of analog QAM channels and a particular one of a number of program streams associated with that analog QAM channel. For example, as illustrated, the program stream assignment may be of the form X.Y, where X denotes the assigned analog QAM channel and Y denotes the assigned program stream of that QAM channel. As a more specific example, the assignment 4.1 indicates that program stream 1 of analog QAM channel 4 has been assigned to the roaming user.

In step 7, the OSS 208 signals element 210 to indicate that the assigned program stream for the roaming user is 4.1.

In step 8, the OSS 208 sends a confirmation of the roam resource reservation to the roaming server 204-1.

In step 9, the OSS 208 signals the STB 112R to indicate that the assigned program stream for the roaming user is 4.1. The STB responds by tuning itself to receive this particular assigned program stream.

In step 10, delivery of roaming television content to the roaming user starts. As previously described, this content is obtained by the roaming server 204-1 from another roaming server associated with the head end serving the home location of the user, and is delivered via Ethernet switch 206 and signal combiner 210 through an assigned channel and program stream that is typically used for delivery of VoD or NPVR content from the VoD/NPVR server 216. The roaming content is received by the STB 112R in the assigned program stream, and is presented to the roaming user via the television 110R.

As indicated previously, steps 1' and 2' of FIG. 2 illustrate a subsequent channel change operation initiated by the roaming user.

In step 1', the user requests a channel change in the roaming television service. For example, the user may press a channel up or channel down button on a remote control device associated with STB 112R, directly enter a particular channel number, select a new channel via a displayed electronic programming guide, etc. This request is communicated by the STB 112R to the roaming server 204-1. In an alternative embodiment, the request may pass through the OSS 208 before being delivered to the roaming server 204-1, or be communicated in some other way between STB 112R and roaming server 204-1.

In step 2', the roaming server 204-1 obtains the content associated with the newly-selected channel, for example, by signaling another roaming server 204 associated with the home location head end of the roaming user over the transport network 205. This other roaming server delivers the content associated with the newly-selected channel to the roaming server 204-1 over the transport network 205. The roaming server 204-1 then delivers it to the Ethernet switch 206, from which it is delivered in the same manner as the initial channel, e.g., in assigned stream 4.1, from signal combiner 210 to STB 112R over HFC pipe 211. Any number of additional channel changes can be accommodated in a similar manner.

Thus, in the illustrative embodiment, a single program stream normally used for delivery of VoD or NPVR content from the VoD/NPVR server 216 of head end 202 is assigned to a roaming user and utilized to deliver roaming content to that user. The roaming content may originate from a head end which services the home location of the roaming user. A roaming content channel change at STB 112R is implemented by simply altering the content that is delivered by roaming server 204-1 to Ethernet switch 206 for delivery from signal combiner 210 to STB 112R in the particular program stream assigned to the roaming user. Generally, such content is transported in real-time from the roaming server nearest the home location to the roaming server 204-1.

Although in the foregoing embodiment the program stream assigned to the roaming user is one of a number of streams normally utilized for delivery of VoD or NPVR content from VoD/NPVR server 216 at head end 202, the assigned program stream in other embodiments may be part of the HFC pipe bandwidth that is separately allocated for assignment to various roaming users. Numerous other types of unicast infrastructure may be used.

Figure 4:
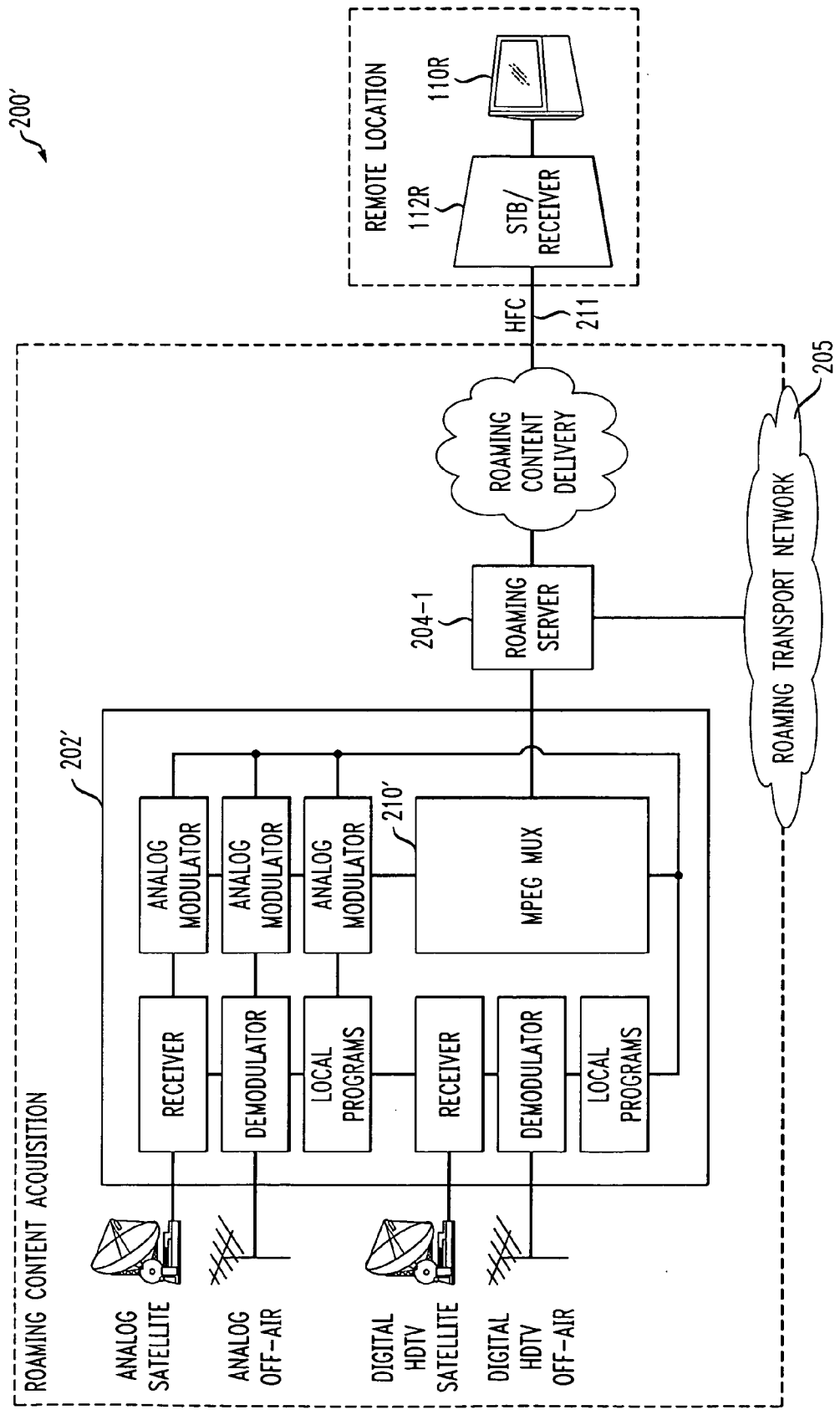
FIG. 4 shows an alternative implementation of the FIG. 1A system in another embodiment of the invention.

As noted above, the particular system configuration shown in FIG. 2 is presented by way of illustrative example only. FIG. 4 shows one possible alternative arrangement of system 200. In this embodiment, system 200' comprises head end equipment 202' which includes a signal combiner 210' implemented as an MPEG multiplexer. The cable head end equipment further comprises receivers, demodulators and analog modulators associated with various signal sources, including analog satellite and off-air sources, and digital high definition television (HDTV) satellite and off-air sources. Numerous other types of sources not specifically shown may be additionally or alternatively used. The roaming server 204-1 in this embodiment is coupled between the head end equipment 202' and the HFC pipe 211 which is used to implement roaming content delivery. In other embodiments, the roaming server 204-1 may be considered part of the head end equipment. Roaming server 204-1 is also coupled to the transport network 205 as shown.

By assigning a single program stream for delivery of roaming television content from head end equipment to an interface device of a roaming user, the illustrative embodiments make advantageous use of existing unicast infrastructure, allowing efficient and cost-effective deployment of roaming television services in existing cable television systems. The described techniques can also be adapted in a straightforward manner for use in other types of signal distribution systems.

Again, the above-described embodiments of the invention are intended to be illustrative only. For example, although described in the context of particular signal distribution systems, the invention is not restricted to use in such systems. The described roaming television services techniques can be adapted in a straightforward manner to a wide variety of alternative systems, including satellite and IPTV systems, using different arrangements of system elements. As indicated above, the techniques can be applied to a wide variety of subscription media services, including subscription audio services delivered via digital satellite radio, and to other arrangements for delivering signals associated with subscription media services.

Further, the media streams that are delivered to a remote location on behalf of a given subscriber may include any type of data, including, for example, digital audio, video, speech or other information signals, in any combination.

These and numerous other alternative embodiments within the scope of the following claims will be readily apparent to those skilled in the art.

We claim:

1. A method of providing access to a subscription service in a signal distribution system to a system user at a location remote from a home location of the user, the subscription service comprising a plurality of selectable channels available to the user at the home location, the remote location being serviced by head end equipment of the system, the method comprising the steps of:

assigning to the user one of a plurality of program streams utilizable for delivery of content from the head end equipment to an interface device at the remote location;

obtaining in the head end equipment content for a first channel of the subscription service available to the user at the home location; and inserting the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the program streams from which the assigned program stream is selected are part of a single communication channel between the head end equipment and the interface device at the remote location;

wherein absent assignment of the assigned program stream the program streams that are part of the single communication channel are otherwise utilized to provide subscription service access to another system user having the remote location as its home location;

wherein the content for the first channel replaces content which would otherwise be provided to the other system user in the assigned program stream; and wherein the single communication channel comprises dedicated unicast infrastructure for delivery of one or more unicast streams to the other system user having the remote location as its home location.

2. The method of claim 1 wherein the assigned program stream comprises at least one unicast stream.

3. The method of claim 1 wherein the assigned program stream comprises at least one program stream normally utilized for delivery of video-on-demand (VoD) content from a VoD server in the head end equipment to the interface device.

4. The method of claim 1 wherein the assigned program stream comprises at least one program stream normally utilized for delivery of network personal video recorder (NPVR) content from an NPVR server in the head end equipment to the interface device.

5. The method of claim 1 wherein the head end equipment comprises cable network head end equipment of a cable television system.

6. The method of claim 1 wherein the interface device comprises a set-top box.

7. The method of claim 1 wherein the content for one or more of the channels is obtained by the head end equipment from a roaming server coupled via a transport network to one or more additional roaming servers.

8. The method of claim 7 wherein the roaming server is external to the head end equipment.

9. The method of claim 7 wherein the head end equipment comprises an Ethernet switch coupled to the roaming server.

10. The method of claim 7 wherein the roaming server is coupled between the interface device and the head end equipment.

11. A method of providing access to a subscription service in a signal distribution system to a system user at a location remote from a home location of the user, the subscription service comprising a plurality of selectable channels available to the user at the home location, the remote location being serviced by head end equipment of the system, the method comprising the steps of:

assigning to the user one of a plurality of program streams utilizable for delivery of content from the head end equipment to an interface device at the remote location;

obtaining in the head end equipment content for a first channel of the subscription service available to the user at the home location; and inserting the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the step of assigning to the user one of a plurality of program streams further comprises the step of assigning to the user one of a plurality of program streams of a given analog QAM channel of a transmission medium;

wherein absent assignment of the assigned program stream the program streams that are part of a single communication channel are otherwise utilized to provide subscription service access to another system user having the remote location as its home location; and wherein the content for the first channel replaces content which would otherwise be provided to the other system user in the assigned program stream.

12. The method of claim 11 wherein the program stream assignment is of the form X.Y, where X denotes an assigned analog QAM channel and Y denotes the assigned program stream of that QAM channel.

13. The method of claim 1 wherein the head end equipment comprises a controllable signal combiner coupled via a transmission medium to the interface device.

14. The method of claim 13 wherein the step of assigning to the user one of a plurality of program streams further comprises determining in a controller the particular program stream to be assigned and communicating information identifying the assigned program stream from the controller to the signal combiner and the remote location interface device.

15. The method of claim 1 further including the step of the user initiating a roam setup request via the interface device at the remote location.

16. The method of claim 15 further including the step of forwarding the roam setup request from the interface device via a controller to a roaming server that delivers to the head end equipment the content for the first channel of the subscription service.

17. The method of claim 16 further including the step of the roaming server issuing a roam resource reservation request to the controller responsive to the roam setup request.

18. The method of claim 16 wherein the controller assigns the particular one of the plurality of streams to the user responsive to the roam resource reservation request from the roaming server.

19. An interface device comprising a processor coupled to a memory and being configured for use in providing access to a subscription service in a signal distribution system to a system user at a location remote from a home location of the user, the subscription service comprising a plurality of selectable channels available to the user at the home location, the interface device being connectable to head end equipment servicing the remote location;

wherein the user is assigned one of a plurality of program streams utilizable for delivery of content from the head end equipment to the interface device at the remote location, the head end equipment being operative to obtain content for a first channel of the subscription service available to the user at the home location, and to insert the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the program streams from which the assigned program stream is selected are part of a single communication channel between the head end equipment and the interface device at the remote location;

wherein absent assignment of the assigned program stream the program streams that are part of the single communication channel are otherwise utilized to provide subscription service access to another system user having the remote location as its home location;

wherein the content for the first channel replaces content which would otherwise be provided to the other system user in the assigned program stream; and wherein the single communication channel comprises dedicated unicast infrastructure for delivery of one or more unicast streams to the other system user having the remote location as its home location.

20. An apparatus for use in providing access to a subscription service in a signal distribution system to a system user at a location remote from a home location of the user, the subscription service comprising a plurality of selectable channels available to the user at the home location, the apparatus comprising:

head end equipment comprising at least one server, the head end equipment being adapted for communication with an interface device at the remote location;

wherein the user is assigned one of a plurality of program streams utilizable for delivery of content from the head end equipment to the interface device at the remote location;

the head end equipment being operative to obtain content for a first channel of the subscription service available to the user at the home location, and to insert the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the program streams from which the assigned program stream is selected are part of a single communication channel between the head end equipment and the interface device at the remote location;

wherein absent assignment of the assigned program stream the program streams that are part of the single communication channel are otherwise utilized to provide subscription service access to another system user having the remote location as its home location;

wherein the content for the first channel replaces content which would otherwise be provided to the other system user in the assigned program stream; and wherein the single communication channel comprises dedicated unicast infrastructure for delivery of one or more unicast streams to the other system user having the remote location as its home location.

21. An interface device comprising a processor coupled to a memory and being configured for use in providing access to a subscription service in a signal distribution system to a system user at a location remote from a home location of the user, the subscription service comprising a plurality of selectable channels available to the user at the home location, the interface device being connectable to head end equipment servicing the remote location;

wherein the user is assigned one of a plurality of program streams utilizable for delivery of content from the head end equipment to the interface device at the remote location, the head end equipment being operative to obtain content for a first channel of the subscription service available to the user at the home location, and to insert the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the user is assigned one of the plurality of program streams by assigning to the user one of a plurality of program streams of a given analog QAM channel of a transmission stream;

wherein absent assignment of the assigned program stream the program streams that are part of a single communication channel are otherwise utilized to provide subscription service access to another system user having the remote location as its home location; and wherein the content for the first channel replaces content which would otherwise be provided to the other system user in the assigned program stream.

22. An apparatus for use in providing access to a subscription service in a signal distribution system to a system user at a location remote from a home location of the user, the subscription service comprising a plurality of selectable channels available to the user at the home location, the apparatus comprising:

head end equipment comprising at least one server, the head end equipment being adapted for communication with an interface device at the remote location;

wherein the user is assigned one of a plurality of program streams utilizable for delivery of content from the head end equipment to the interface device at the remote location;

the head end equipment being operative to obtain content for a first channel of the subscription service available to the user at the home location, and to insert the content for the first channel into the assigned program stream to thereby make said content accessible to the user at the remote location via the interface device;

wherein user selection via the interface device of a different channel of said subscription service available to the user at the home location causes the content for the different channel to be obtained by the head end equipment and inserted into the assigned program stream in place of the content for the first channel;

wherein the user is assigned one of the plurality of program streams by assigning to the user one of a plurality of program streams of a given analog QAM channel of a transmission stream;

wherein absent assignment of the assigned program stream the program streams that are part of a single communication channel are otherwise utilized to provide subscription service access to another system user having the remote location as its home location; and wherein the content for the first channel replaces content which would otherwise be provided to the other system user in the assigned program stream.

* * * * *